(12) United States Patent
Ostertag et al.

(10) Patent No.: US 12,517,922 B2
(45) Date of Patent: Jan. 6, 2026

(54) PIPELINED LANGUAGE-INDEPENDENT DATA FORMAT TABLE

(71) Applicant: SAP SE, Walldorf (DE)

(72) Inventors: Alexander Ostertag, Walldorf (DE); Manuel Mayr, Walldorf (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/747,042

(22) Filed: Jun. 18, 2024

(65) Prior Publication Data

US 2025/0384054 A1 Dec. 18, 2025

(51) Int. Cl.
*G06F 16/25* (2019.01)

(52) U.S. Cl.
CPC .................... *G06F 16/258* (2019.01)

(58) Field of Classification Search
None
See application file for complete search history.

(56) References Cited

U.S. PATENT DOCUMENTS

| | | | |
|---|---|---|---|
| 10,191,944 B2 * | 1/2019 | Liu | G06F 16/24544 |
| 11,341,317 B2 * | 5/2022 | Liu | H03M 7/707 |
| 2012/0278473 A1 * | 11/2012 | Griffiths | G06F 16/182 |
| | | | 709/224 |

* cited by examiner

*Primary Examiner* — Amresh Singh
(74) *Attorney, Agent, or Firm* — SCHWEGMAN LUNDBERG & WOESSNER, P.A.

(57) ABSTRACT

In an example embodiment, the execution of a command (such as JSON_TABLE) to convert language-independent data format data to a structured table is performed by parallel processing the data in parallel and without buffering all of the input and output. More specifically, a pipelined approach is used that is parallelizable and reduces memory requirements. Input rows are parallel processed within chunks, while produced rows are output directly.

20 Claims, 5 Drawing Sheets

PIPELINED LANGUAGE-INDEPENDENT DATA FORMAT TABLE

BACKGROUND

A database may be configured to store a plurality of electronic data records. These data records may be organized, in accordance with a database schema, into various database objects comprising, for example, one or more database tables. The database is coupled with a database management system (DBMS), which may be configured to support a variety of database operations for accessing the data records stored in the database. These database operations may include, for example, structured query language (SQL) queries and/or the like.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Relational database systems store large amounts of data, comprising business data that can be analyzed to support business decisions. Typically, data records in a relational database management system in a computing system are maintained in tables, which are a collection of rows all having the same columns. Each column maintains information on a particular type of data for the data records which comprise the rows. Tables that are accessible to the operator are known as base tables, and tables that store data that describe base tables are known as catalog tables. The data stored in the catalog table is not readily visible to an operator of the database. Rather, the data stored in the catalog table pertains to meta-data. In the case of a database, the meta-data stored in the catalog table describes operator visible attributes of the base table, such as the names and types of columns, as well as statistical distribution of column values. Typically, a database comprises catalog tables and base tables. The catalog tables and base tables function in a relational format to enable efficient use of data stored in the database.

A relational database management system uses relational techniques for storing, manipulating, and retrieving information, and is further designed to accept commands to store, retrieve, and remove data. Structured Query Language (SQL) is a commonly used and well-known example of a command set utilized in relational database management systems and shall serve to illustrate a relational database management system. An SQL query often comprises predicates, also known as user-specified conditions. The predicates are used to limit query results; one common operation in a JSON_TABLE function. Javascript Object Notation (JSON) is a language-independent data format that uses text to store and transmit data objects comprising attribute-value pairs and arrays (or other serializable values). The JSON_TABLE function is used to convert JSON data into relational format, typically in the form of rows and columns. It allows a user to query and manipulate JSON data in a structured way. A user is able to specify a JSON column (a column in the JSON data) as well as the names of columns to create in the resulting table, as well as a path expression that specifies the elements of the JSON data to extract. The user can also specify the data type of each column.

Figure 1:
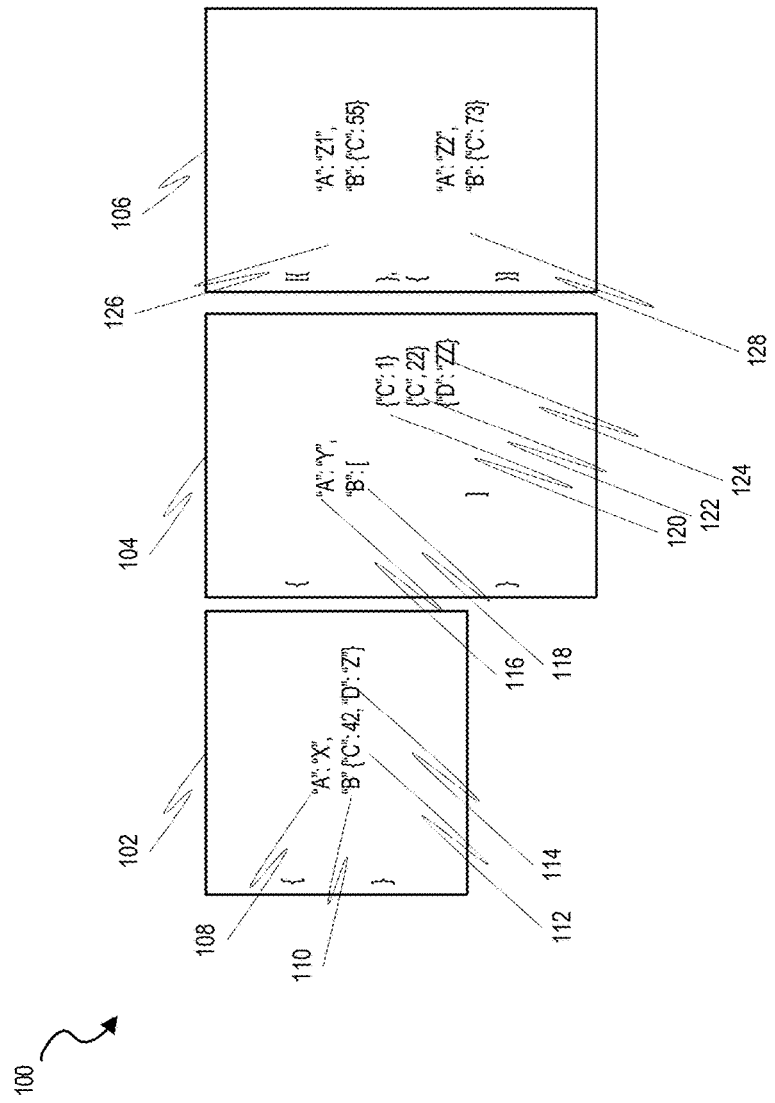
FIG. 1 is a diagram illustrating an example of JSON data, in accordance with an example embodiment.

FIG. 1 is a diagram illustrating an example of JSON data 100, in accordance with an example embodiment. Here, the JSON data 100 contains three JSON documents, specifically JSON document 102, JSON document 104, and JSON document 106. Each of the JSON documents 102, 104, 106 contain different types of nested data. Here, the JSON document 102 defines an array of two variables. The first variable A 108 contains the value "X", while the second variable B 110 itself contains a JSON object of its own two key/value pairs (C 112, with a value of 42 and D 114, with a value of Z).

The JSON document 104 defines an object of two variables. The first variable A 116 contains the value "Y", while the second variable B 118 itself contains an array of objects, comprising object 120, object 122, and object 124, each with variables and values.

The JSON document 106 defines an array of two objects, specifically object 126 and object 128.

The JSON_TABLE function allows a user to define an access path to coerce specific JSON data into SQL types. This enables the system to map parts of a JSON document into a relational format, bridging the gap between a hierarchical document and a relation bit. The created relational columns can stem from top level fields of the document or can be fields nested inside other JSON containers, such as JSON objects or arrays. As once the JSON documents are converted to SQL table, the system can no longer track which JSON documents the produced rows stemmed from and there may also be a need to number rows obtained from nested columns; JSON_TABLE supports so-called ordinality columns which assign a sequential number to each row. For instance, if one is only interested in the fields A and C, with additional ordinality columns one can use the following SQL statement to convert the documents:

select JT.*
FROM JSON_TABLE(T1.DOC, '$'
COLUMNS (
  RN1 FOR ORDINALITY,
  A NVARCHAR(20) PATH '$.A',
  NESTED PATH '$.B'

```
    COLUMNS (
      RN2 FOR ORDINALITY,
      C INT PATH '$.C'
    )
  )
  EMPTY ON ERROR
) AS JT;
```

A potential resulting SQL table could look as follows:

| RN1 | A  | RN2 | C    |
|-----|----|----|------|
| 1   | X  | 1   | 42   |
| 2   | Y  | 1   | 1    |
| 2   | Y  | 2   | 22   |
| 2   | Y  | 3   | NULL |
| 3   | Z1 | 1   | 55   |
| 4   | Z2 | 1   | 73   |

With RN1 and RN2 being nested ordinality columns.

For JSON document 102, one can just create a single row, holding the values of fields "A" and "C". For JSON document 104, as "B" is a JSON array of size 3, one may create three rows from it by extracting the values of "C" and repeating the single value of "A". As JSON document 106 contains a JSON array of size 2 at top-level, with objects for field "B", one may create two rows from it, holding the values of "A" and the extracted value "C".

While the ordinality columns for the nested columns (RN2) are created locally for each nested column (i.e., always start again from 1), they are assigned globally for all output rows for the top-level ordinality column (RN1). If the document contains a JSON array on the top-level, the rows created for each array element are assigned with their own ordinality number. In this case, the ordinality values form a consecutive interval. Otherwise, all rows of a document have the same ordinality value. Also, looking at the ordinality values of all produced rows, they are not allowed to contain any "wholes", i.e., they must form an interval.

Finally, the JSON_TABLE statement provides options how to deal with errors that occur during parsing of JSON documents. Besides "local" error handling options that affect errors during extraction of single fields (e.g., an integer column was requested, but a string was found), there is a global error handling option that handles errors on document level (e.g., if the document is not a valid JSON document). There are two global options, EMPTY ON ERROR and ERROR ON ERROR. For EMPTY ON ERROR, the result must be empty if any error occurred on global level, otherwise, for ERROR ON ERROR, an error must be thrown. That means, that if the table t1 contained a fourth invalid JSON document, the above query should produce an empty result (due to the defined EMPTY ON ERROR behavior). For ERROR ON ERROR behavior, an error should be thrown.

A simple approach would be to calculate the JSON_TABLE sequentially within a single thread. This approach would first collect all rows from the input table and parse them sequentially within a single thread, while buffering all produced rows. If no global error occurred during that process, all rows would be output. Otherwise, depending on the global error handling option, an empty result would be output, or an error was thrown.

However, this approach is suboptimal in terms of both memory consumption and runtime cycles. Specifically, the buffering of the entire input and output uses too much memory and processing the rows sequentially uses too many processing cycles.

In an example embodiment, the execution of a command (such as JSON_TABLE) to convert language-independent data format data to a structured table is performed by parallel processing of the data in parallel and without buffering all of the input and output. More specifically, a pipelined approach is used that is parallelizable and reduces memory requirements. Input rows are parallel processed within chunks, while produced rows are output directly.

Implementation, however, can introduce several technical problems that need to be overcome. The first is in error handling. As mentioned before, one potential option for a JSON_TABLE command is the "EMPTY ON ERROR" setting, which causes an empty result whenever an error is encountered in processing the data. This is fairly straightforward to implement when all input rows are processed sequentially since the output can be held until it is known that all input rows were processed without error. If an error occurs at any point, processing can simply stop and an empty result can be output. The same is not true, however, when the rows are processed in parallel, since it is possible that the processing and output of one row can occur without error while the processing and output of another row can encounter an error.

In an example embodiment, a determination is made whether or not an EMPTY ON ERROR setting is used in a JSON_TABLE command and, if so, the parallelization techniques described herein are not used. In another example embodiment, outputs of each parallelization unit are held until all the parallel operations have been completed, and thus if one of the parallelization units had an error in execution, then an empty result can be output.

Another technical issue involves top-level ordinality columns. Although input rows can be parsed almost completely independently of each other, there is a dependency between them for top-level ordinality columns, since ordinality values must be consecutive. One approach to solve this problem would be to use a global ordinality value counter, which gets protected against parallel read/write operations using a lock. Although this helps with memory utilization, the scalability would still be bad due to high contention on a single lock. In an example embodiment, a global atomic ordinality value counter is used. Depending on the top-level element of the document, a thread must parse; there are two cases:

(1) The top-level element is not an array: Here the thread reserves an ordinality value by obtaining the current global counter value and incrementing the counter by 1 via atomic fetch_add function. This reserved value is then used for all output rows of the current input row.

(2) The top-level element is an array: Here the thread first parses the array to determine its size. Afterwards, it reserves a range of ordinality values for the current input rows by obtaining the current global counter value (current_ordinality_value) and incrementing the counter by the array size via atomic fetch_add(array_size) function. For each element in the array, the thread then produces all rows and assigns current_ordinality_value as ordinality value. After all rows of the current array element are finished, current_ordinality_value is incremented by one and this process is repeated until all rows for the array are produced.

Figure 2:
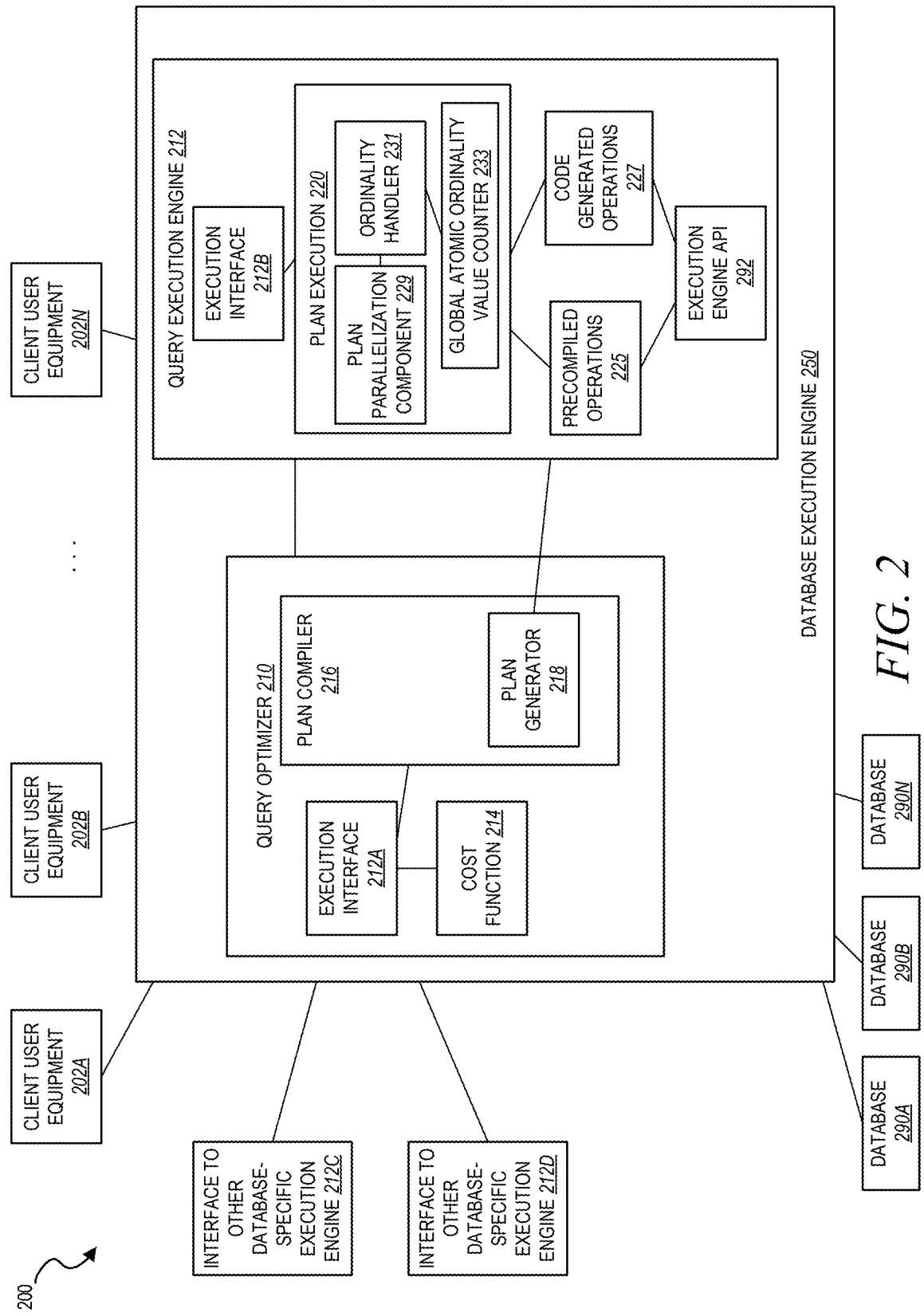
FIG. 2 is a block diagram illustrating an example of a database management system, in accordance with some example implementations.

FIG. 2 is a block diagram illustrating an example of a database management system 200, in accordance with some example implementations.

The database management system 200 may include one or more user equipment 202A, 202B, . . . , 202N, such as a computer, a smartphone, a tablet, an Internet of Things (IoT) device, and/or other computer or processor-based devices.

The user equipment may include a user interface, such as a browser or other application to enable access to one or more applications, database layer(s), and/or databases, to generate queries to one or more databases 290A, 290B, . . . , 290N, and/or to receive responses to those queries.

In the example of FIG. 2, the databases 290A, 290B, . . . , 290N represent the database layer of a database management system where data may be persisted and/or stored in a structured way, and where the data can be queried or operated on using operations comprising SQL commands or other types of commands/instructions to provide reads, writes, and/or perform other operations. To illustrate by way of an example, user equipment 202A, 202B, . . . , 202N may send a query via an execution engine 250 to the databases 290A, 290B, . . . , 290N, which may represent a persistence and/or storage layer where database tables may be stored and/or queried. The query may be sent via a connection, such as a wired and/or wireless connection (e.g., the Internet, cellular links, WiFi links, and/or the like).

The database execution engine 250 may include a query optimizer 210, such as a SQL optimizer and/or another type of optimizer, to receive at least one query from a user equipment and generate a query plan (which may be optimized) for execution by the query execution engine 212. The query optimizer 210 may receive a request, such as a query, and then form or propose an optimized query plan. The query plan (which may be optimized) may be represented as so-called "query algebra" or "relational algebra."

For example, a database command "SELECT id, x, n FROM T1 JOIN T2 ON T1.x=T2.x ORDER BY T2.n LIMIT K" may be received by the database execution engine 250 comprising the query optimizer 210. There may be several ways of implementing execution of this query. As such, the query plan may offer hints or propose an optimum query plan with respect to the execution time of the overall query. To optimize a query, the query optimizer 210 may obtain one or more costs for the different ways the execution of the query plan can be performed. The costs may be obtained via the execution interface 212A from a cost function 214, which responds to the query optimizer 210 with the cost(s) for a given query plan (or portion thereof), and these costs may be in terms of execution time at the databases 290A, 290B, . . . , 290N, for example.

The query optimizer 210 may form an optimum query plan, which may represent a query algebra, as noted above. To compile a query plan, the query optimizer 210 may provide the query plan to the query plan compiler 216 to enable compilation of some, if not all, of the query plan. The query plan compiler 216 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, a plan compiler may select pre-compiled code for a given operation as part of the optimization of the query plan, while for another operation in the query plan, the plan compiler may allow a compiler to generate the code. The pre-compiled and generated code represents code for executing the query plan, and this code may be provided to the plan generator 218, which interfaces with the plan execution engine 220.

In some implementations, the query optimizer 210 may optimize the query plan by compiling and generating code. Moreover, the query optimizer 210 may optimize the query plan to enable pipelining during execution.

In some implementations, the query optimizer 210 may be configured to select other execution engines. For example, the query optimizer 210 may select via interface 212C, an execution engine configured specifically to support a row-store database or an ABAP type database, or the query optimizer 210 may select, via interface 212D, an execution engine configured specifically to support a column-store type database. In this way, the query optimizer 210 may select whether to use the universal database execution engine 250 or legacy (e.g., database-specific) execution engines (available via interfaces 212C/D, for example).

The query execution engine 212 may receive from the plan generator 218, compiled code to enable execution of the optimized query plan, although the query execution engine may also receive code or other commands directly from a higher-level application or other device, such as user equipment 202A-N.

The query execution engine 212 may then forward, via an execution interface 212B, the code to a plan execution engine 220. The plan execution engine may then prepare the plan for execution, and this query plan may include pre-compiled code 225 and/or generated code 227. In an example embodiment, a plan parallelization component 229 may, for certain types of JSON_TABLE commands (e.g., ones that do not have an EMPTY ON ERROR option selected), parallelize the operations of converting JSON data to relational format. It may operate in conjunction with an ordinality handler 231, which uses a global atomic ordinality value counter 233 to maintain the proper ordinality of the converted relational data, as described earlier.

Figure 3:
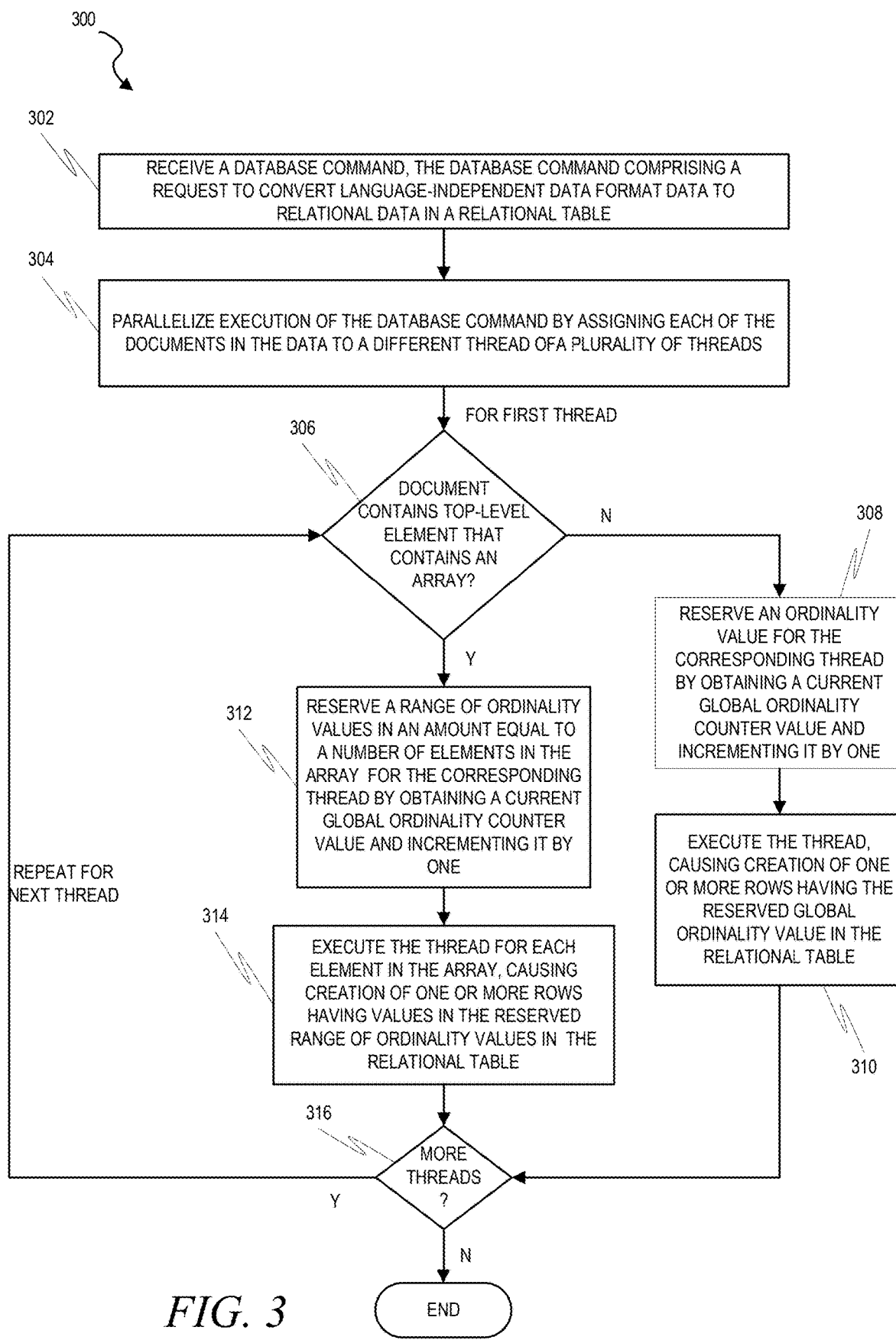
FIG. 3 is a flowchart of an example method for processing a database command, in accordance with an example embodiment.

FIG. 3 is a flowchart of an example method for processing a database command, in accordance with an example embodiment.

At operation 302, a database command is received. The database command comprises a request to convert language-independent data format data to relational data in a relational table. The language-independent data format data comprises a plurality of documents, each document describing variables and Values for the variables, some of the variables being nested within other of the variables.

At operation 304, execution of the database command is parallelized by assigning each of the documents to a different thread of a plurality of threads for parallel execution.

A loop is then begun that iterates for each thread in the plurality of threads. At operation 306, it is determined if the corresponding document for the thread has a top-level element that contains an array. If not, then at operation 308, an ordinality value is reserved for the corresponding thread by obtaining a current global ordinality counter value and incrementing the current global ordinality counter value by one. At operation 310, the thread is executed, causing creation of one or more rows having the reserved global ordinality value in the relational table.

If at operation 306 it was determined that the document does contain a top-level element that contains an array, then at operation 312 a range of ordinality values in an amount equal to a number of elements in the array is reserved for the corresponding thread, by obtaining a current ordinality counter value and incrementing it by one. Then at operation 314, the thread is executed for each element in the array, causing creation of one or more rows having values in the reserved range of ordinality values in the relational table.

Then at operation 316, it is determined if there are any more threads in the plurality of threads. If so, then the method 300 loops back to operation 306 for the next thread in the plurality of threads. If not, then the method 300 ends.

A loop is then begun for each partition on the disk, beginning with a first partition. At operation 308, rows from a corresponding partition are written into the memory. At operation 310, the rows are sorted. At operation 312, the sorted rows are written back to the corresponding partition. At operation 314, a plurality of rows is moved from the corresponding partition into an in-memory buffer unique to the corresponding partition.

At operation 316, it is determined if there are any more threads. If so, then the method 300 repeats back up to operation 306, for the next thread. If not, then the method 300 ends.

In view of the above-described implementations of subject matter, this application discloses the following list of examples, wherein one feature of an example in isolation or more than one feature of the example taken in combination and, optionally, in combination with one or more features of one or more further examples are further examples also falling within the disclosure of this application:

Example 1 is a system comprising: at least one hardware processor; a computer-readable medium storing instructions that, when executed by the at least one hardware processor, cause the at least one hardware processor to perform operations comprising: receiving a database command, the database command comprising a request to convert language-independent data format data to relational data in a relational table, the language-independent data format data comprising a plurality of documents, each document describing variables and values for the variables, some of the variables being nested within other of the variables; parallelizing execution of the database command by assigning each of the documents to a different thread of a plurality of threads for parallel execution; for each of the plurality of threads: determining whether the corresponding document has a top-level element that contains an array; and in response to a determination that the corresponding document does not have a top-level element that contains an array: reserving an ordinality value for the corresponding thread by obtaining a current global ordinality counter value and incrementing the current global ordinality counter value by one; and executing the thread, causing creation of one or more rows having the reserved global ordinality counter value in the relational table.

In Example 2, the subject matter of Example 1 comprises, wherein the operations further comprise: for each of the plurality of threads in response to a determination that the corresponding document does have a top-level element that contains an array: reserving a range of ordinality values in an amount equal to a number of elements in the array by obtaining the current global ordinality counter value and incrementing the current global ordinality counter value by the amount; and executing the thread for each element in the array, causing creation of one or more rows having values in the reserved range of ordinality values in the relational table.

In Example 3, the subject matter of Example 2 comprises, wherein the executing the thread for each element in the array further comprises: when all rows for an element of the array have been created, incrementing the current global ordinality counter value by one.

In Example 4, the subject matter of Examples 1-3 comprises, wherein the executing is performed without loading all data from the language-independent data format data into a buffer.

In Example 5, the subject matter of Examples 1-4 comprises, wherein the operations further comprise: determining whether the database command contains an EMPTY ON ERROR option; and wherein the parallelizing, reserving, and executing are performed in response to a determination that the database command does not contain an EMPTY ON ERROR option.

In Example 6, the subject matter of Examples 1-5 comprises, wherein the relational table is a Structured Query Language (SQL) table.

In Example 7, the subject matter of Examples 1-6 comprises, wherein the database command is a JSON_TABLE command.

Example 8 is a method comprising: receiving a database command, the database command comprising a request to convert language-independent data format data to relational data in a relational table, the language-independent data format data comprising a plurality of documents, each document describing variables and values for the variables, some of the variables being nested within other of the variables; parallelizing execution of the database command by assigning each of the documents to a different thread of a plurality of threads for parallel execution; for each of the plurality of threads: determining whether the corresponding document has a top-level element that contains an array; and in response to a determination that the corresponding document does not have a top-level element that contains an array: reserving an ordinality value for the corresponding thread by obtaining a current global ordinality counter value and incrementing the current global ordinality counter value by one; and executing the thread, causing creation of one or more rows having the reserved global ordinality counter value in the relational table.

In Example 9, the subject matter of Example 8 comprises, for each of the plurality of threads in response to a determination that the corresponding document does have a top-level element that contains an array: reserving a range of ordinality values in an amount equal to a number of elements in the array by obtaining the current global ordinality counter value and incrementing the current global ordinality counter value by the amount; and executing the thread for each element in the array, causing creation of one or more rows having values in the reserved range of ordinality values in the relational table.

In Example 10, the subject matter of Example 9 comprises, wherein the executing the thread for each element in the array further comprises: when all rows for an element of the array have been created, incrementing the current global ordinality counter value by one.

In Example 11, the subject matter of Examples 8-10 comprises, wherein the executing is performed without loading all data from the language-independent data format data into a buffer.

In Example 12, the subject matter of Examples 8-11 comprises, determining whether the database command contains an EMPTY ON ERROR option; and wherein the parallelizing, reserving, and executing are performed in response to a determination that the database command does not contain an EMPTY ON ERROR option.

In Example 13, the subject matter of Examples 8-12 comprises, wherein the relational table is a Structured Query Language (SQL) table.

In Example 14, the subject matter of Examples 8-13 comprises, wherein the database command is a JSON_T-ABLE command.

Example 15 is a non-transitory machine-readable medium storing instructions which, when executed by one or more processors, cause the one or more processors to perform operations comprising: receiving a database command, the database command comprising a request to convert language-independent data format data to relational data in a relational table, the language-independent data format data comprising a plurality of documents, each document describing variables and values for the variables, some of the variables being nested within other of the variables; parallelizing execution of the database command by assigning each of the documents to a different thread of a plurality of threads for parallel execution; for each of the plurality of threads: determining whether the corresponding document has a top-level element that contains an array; and in response to a determination that the corresponding document does not have a top-level element that contains an array: reserving an ordinality value for the corresponding thread by obtaining a current global ordinality counter value and incrementing the current global ordinality counter value by one; and executing the thread, causing creation of one or more rows having the reserved global ordinality counter value in the relational table.

In Example 16, the subject matter of Example 15 comprises, wherein the operations further comprise: for each of the plurality of threads in response to a determination that the corresponding document does have a top-level element that contains an array: reserving a range of ordinality values in an amount equal to a number of elements in the array by obtaining the current global ordinality counter value and incrementing the current global ordinality counter value by the amount; and executing the thread for each element in the array, causing creation of one or more rows having values in the reserved range of ordinality values in the relational table.

In Example 17, the subject matter of Example 16 comprises, wherein the executing the thread for each element in the array further comprises: when all rows for an element of the array have been created, incrementing the current global ordinality counter value by one.

In Example 18, the subject matter of Examples 15-17 comprises, wherein the executing is performed without loading all data from the language-independent data format data into a buffer.

In Example 19, the subject matter of Examples 15-18 comprises, wherein the operations further comprise: determining whether the database command contains an EMPTY ON ERROR option; and wherein the parallelizing, reserving, and executing are performed in response to a determination that the database command does not contain an EMPTY ON ERROR option.

In Example 20, the subject matter of Examples 15-19 comprises, wherein the relational table is a Structured Query Language (SQL) table.

Example 21 is at least one machine-readable medium comprising instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 4:
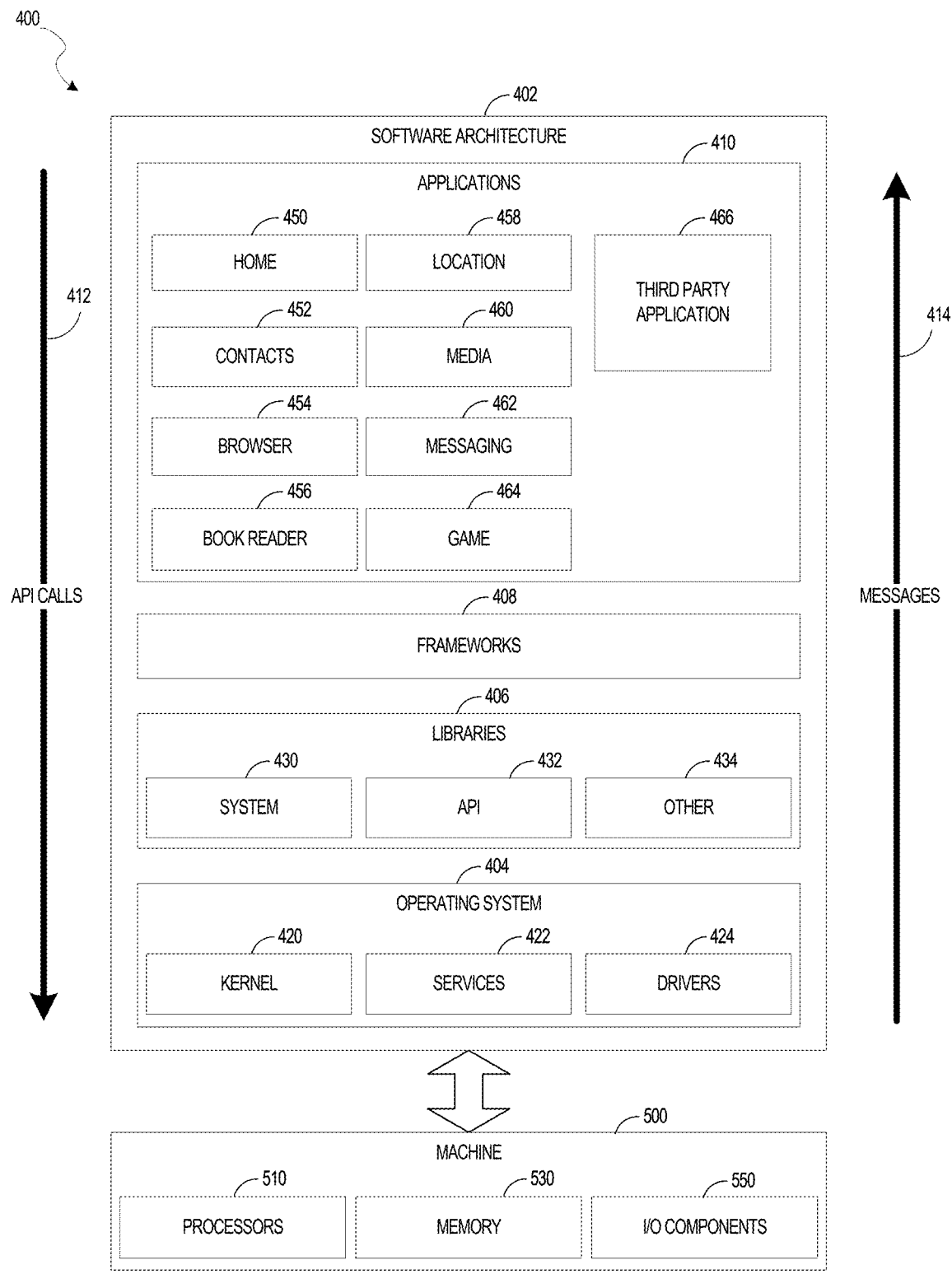
FIG. 4 is a block diagram illustrating a software architecture, in accordance with an example embodiment.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware, such as a machine 500 of FIG. 5 that comprises processors 510, memory 530, and input/output (I/O) components 550. In this example architecture, the software architecture 402 can be conceptualized as a stack of layers where each layer may provide a particular functionality. For example, the software architecture 402 comprises layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 comprises, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionalities. The services 422 can provide other common services for the other software layers. The drivers 424 are responsible for controlling or interfacing with the underlying hardware. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (PEG or JPG), or Portable Network Graphics (PNG), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410. For example, the frameworks 408 provide various graphical user interface functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. The applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit [SDK] by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
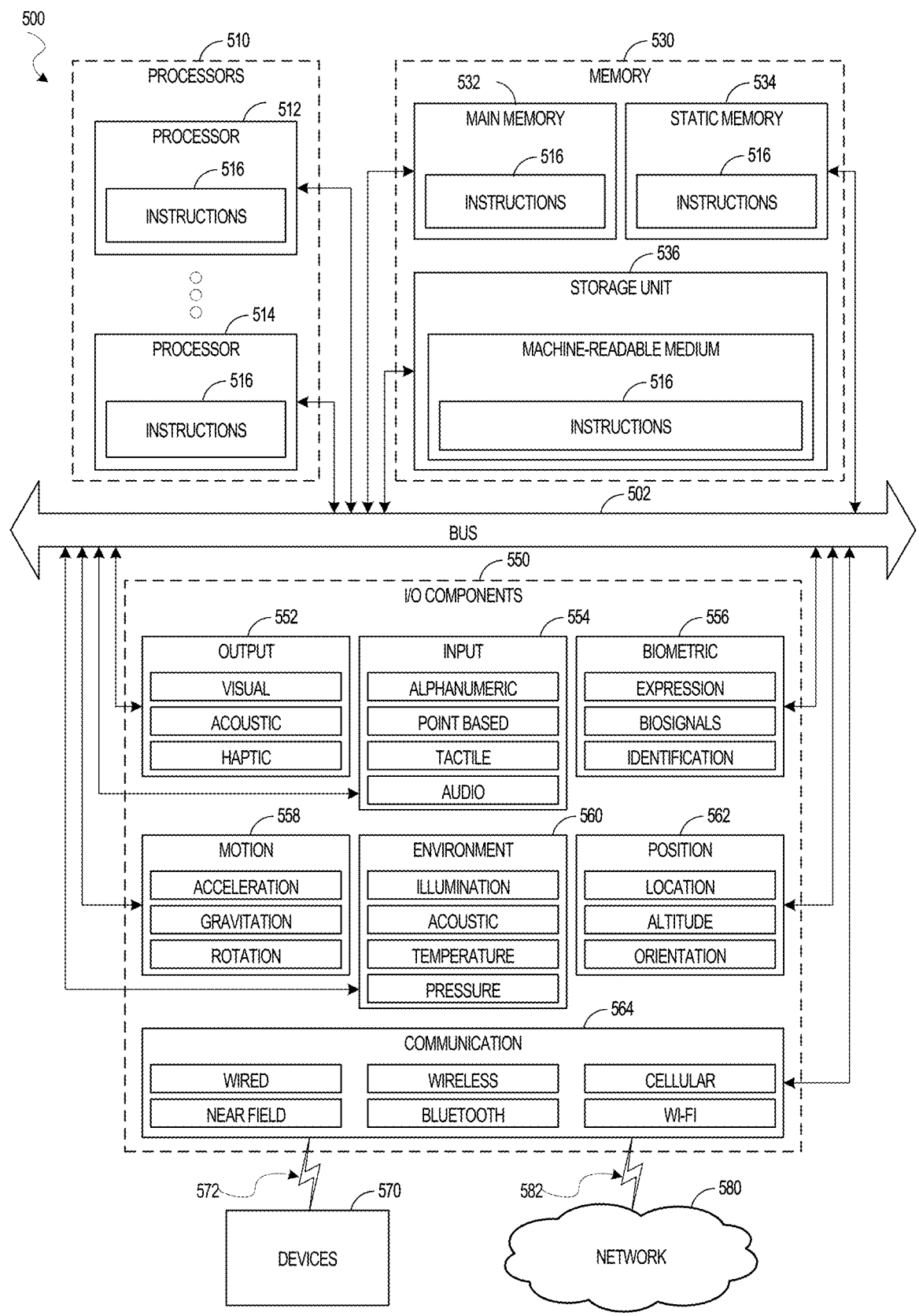
FIG. 5 illustrates a diagrammatic representation of a machine in the form of a computer system within which a set of instructions may be executed for causing the machine to perform any one or more of the methodologies discussed herein.

FIG. 5 illustrates a diagrammatic representation of a machine 500 in the form of a computer system within which a set of instructions may be executed for causing the machine 500 to perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method 300 of FIG. 3. Additionally, or alternatively, the instructions 516 may implement FIGS. 1-3 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer [or distributed] network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device [e.g., a smart watch], a smart home device [e.g., a smart appliance], other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit [CPU], a reduced instruction set computing [RISC] processor, a complex instruction set computing [CISC] processor, a graphics processing unit [GPU], a digital signal processor [DSP], an application-specific integrated circuit [ASIC], a radio-frequency integrated circuit [RFIC], another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel [PDP], a light-emitting diode [LED] display, a liquid crystal display [LCD], a projector, or a cathode ray tube [CRT], acoustic components [e.g., speakers]), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System [GPS] receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code [UPC] bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (e.g., 530, 532, 534, and/or memory of the processor(s) 510) and/or the storage unit 536 may store one or more sets of instructions 516 and data structures (e.g., software) embodied or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, comprising memory internal or external to processors. Specific examples of machine-storage media, computer-storage media, and/or device-storage media include non-volatile memory, comprising by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580, may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) comprising 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., Hypertext Transfer Protocol [HTTP]). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   receiving a database command, the database command comprising a request to convert language-independent data format data to relational data in a relational table, the language-independent data format data comprising a plurality of documents, each document describing variables and values for the variables, some of the variables being nested within other of the variables;
   parallelizing execution of the database command by assigning each of the documents to a different thread of a plurality of threads for parallel execution; and
   for each of the plurality of threads:
   determining whether a corresponding document has a top-level element that contains an array;
   in response to a determination that the corresponding document does not have a top-level element that contains an array:
   reserving an ordinality value for the corresponding thread by obtaining a current global ordinality counter value and incrementing the current global ordinality counter value by one; and
   executing the thread, causing creation of one or more rows having the reserved global ordinality counter value in the relational table.

2. The system of claim 1, wherein the operations further comprise:
   for each of the plurality of threads:
   in response to a determination that the corresponding document does have a top-level element that contains an array:
   reserving a range of ordinality values in an amount equal to a number of elements in the array by obtaining the current global ordinality counter value and incrementing the current global ordinality counter value by the amount; and
   executing the thread for each element in the array, causing creation of one or more rows having values in the reserved range of ordinality values in the relational table.

3. The system of claim 2, wherein the executing the thread for each element in the array further comprises:
   when all rows for an element of the array have been created, incrementing the current global ordinality counter value by one.

4. The system of claim 1, wherein the executing is performed without loading all data from the language-independent data format data into a buffer.

5. The system of claim 1, wherein the operations further comprise:
   determining whether the database command contains an EMPTY ON ERROR option; and
   wherein the parallelizing, reserving, and executed are performed in response to a determination that the database command does not contain an EMPTY ON ERROR option.

6. The system of claim 1, wherein the relational table is a Structured Query Language (SQL) table.

7. The system of claim 1, wherein the database command is a JSON_TABLE command.

8. A method comprising:
   receiving a database command, the database command comprising a request to convert language-independent data format data to relational data in a relational table, the language-independent data format data comprising a plurality of documents, each document describing variables and values for the variables, some of the variables being nested within other of the variables;
   parallelizing execution of the database command by assigning each of the documents to a different thread of a plurality of threads for parallel execution; and
   for each of the plurality of threads:
   determining whether a corresponding document has a top-level element that contains an array; and
   in response to a determination that the corresponding document does not have a top-level element that contains an array:
   reserving an ordinality value for the corresponding thread by obtaining a current global ordinality counter value and incrementing the current global ordinality counter value by one; and
   executing the thread, causing creation of one or more rows having the reserved global ordinality counter value in the relational table.

9. The method of claim 8, further comprising:
   for each of the plurality of threads:
   in response to a determination that the corresponding document does have a top-level element that contains an array:
   reserving a range of ordinality values in an amount equal to a number of elements in the array by obtaining the current global ordinality counter value and incrementing the current global ordinality counter value by the amount; and
   executing the thread for each element in the array, causing creation of one or more rows having values in the reserved range of ordinality values in the relational table.

10. The method of claim 9, wherein the executing the thread for each element in the array further comprises:
    when all rows for an element of the array have been created, incrementing the current global ordinality counter value by one.

11. The method of claim 8, wherein the executing is performed without loading all data from the language-independent data format data into a buffer.

12. The method of claim 8, further comprising:
    determining whether the database command contains an EMPTY ON ERROR option; and
    wherein the parallelizing, reserving, and executing are performed in response to a determination that the database command does not contain an EMPTY ON ERROR option.

13. The method of claim 8, wherein the relational table is a Structured Query Language (SQL) table.

14. The method of claim 8, wherein the database command is a JSON_TABLE command.

15. A non-transitory machine-readable medium storing instructions which, when executed by one or more processors, cause the one or more processors to perform operations comprising:
    receiving a database command, the database command comprising a request to convert language-independent data format data to relational data in a relational table, the language-independent data format data comprising a plurality of documents, each document describing variables and values for the variables, some of the variables being nested within other of the variables;

parallelizing execution of the database command by assigning each of the documents to a different thread of a plurality of threads for parallel execution; and for each of the plurality of threads:

determining whether a corresponding document has a top-level element that contains an array; and in response to a determination that the corresponding document does not have a top-level element that contains an array:

reserving an ordinality value for the corresponding thread by obtaining a current global ordinality counter value and incrementing the current global ordinality counter value by one; and executing the thread, causing creation of one or more rows having the reserved global ordinality counter value in the relational table.

16. The non-transitory machine-readable medium of claim 15, wherein the operations further comprise:

for each of the plurality of threads:

in response to a determination that the corresponding document does have a top-level element that contains an array:

reserving a range of ordinality values in an amount equal to a number of elements in the array by obtaining the current global ordinality counter value and incrementing the current global ordinality counter value by the amount; and executing the thread for each element in the array, causing creation of one or more rows having values in the reserved range of ordinality values in the relational table.

17. The non-transitory machine-readable medium of claim 16, wherein the executing the thread for each element in the array further comprises:

when all rows for an element of the array have been created, incrementing the current global ordinality counter value by one.

18. The non-transitory machine-readable medium of claim 15, wherein the executing is performed without loading all data from the language-independent data format data into a buffer.

19. The non-transitory machine-readable medium of claim 15, wherein the operations further comprise:

determining whether the database command contains an EMPTY ON ERROR option; and wherein the parallelizing, reserving, and executed are performed in response to a determination that the database command does not contain an EMPTY ON ERROR option.

20. The non-transitory machine-readable medium of claim 15, wherein the relational table is a Structured Query Language (SQL) table.

* * * * *